O. H. NELSON.
STORAGE BATTERY STAND AND MEANS FOR RAISING AND SUPPORTING PLATES, &c.
APPLICATION FILED OCT. 16, 1908.
914,301.
Patented Mar. 2, 1909.
3 SHEETS—SHEET 1.
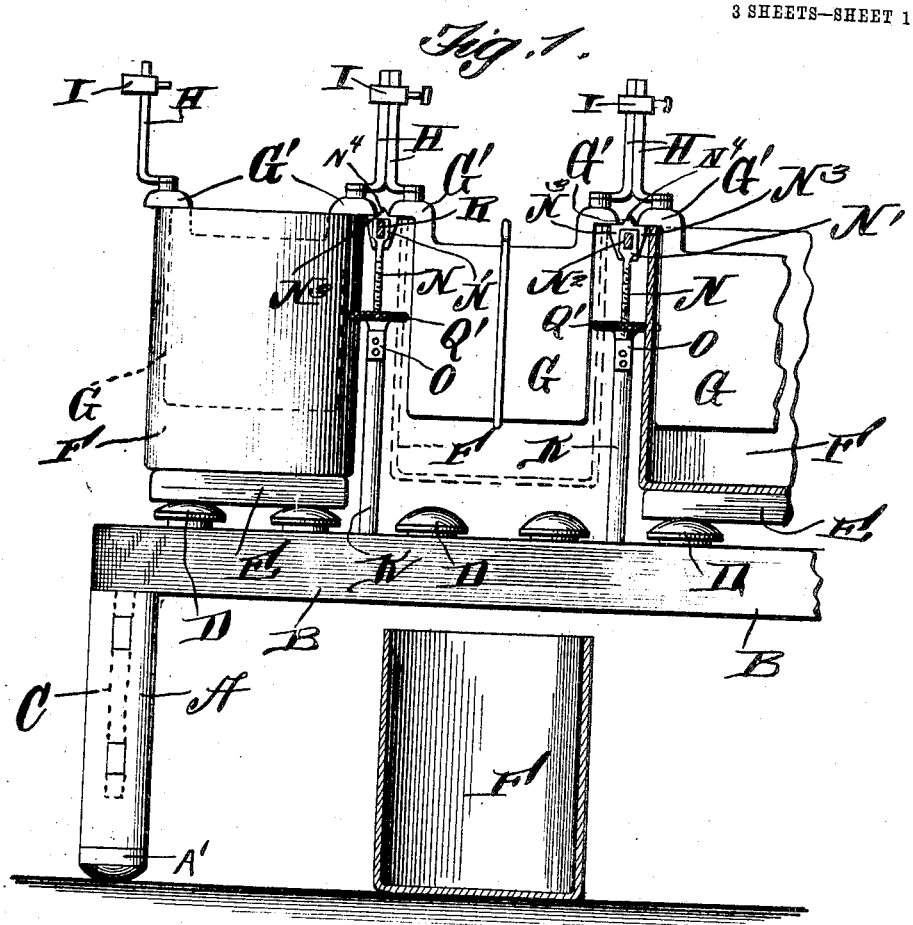
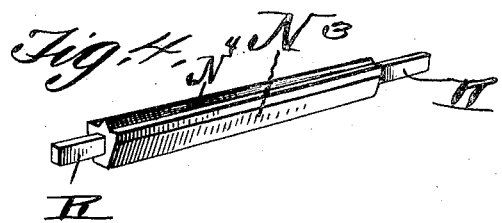
Witnesses
Inventor
By
Attorney O. H. NELSON.
STORAGE BATTERY STAND AND MEANS FOR RAISING AND SUPPORTING PLATES, &c.
APPLICATION FILED OCT. 16, 1908.
914,301.
Patented Mar. 2, 1909.
3 SHEETS—SHEET 2.
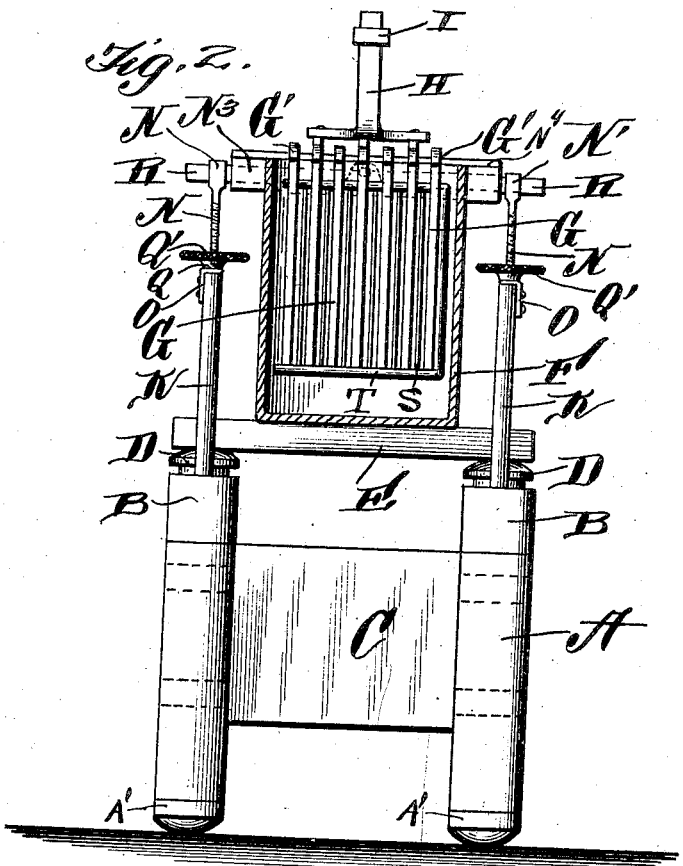
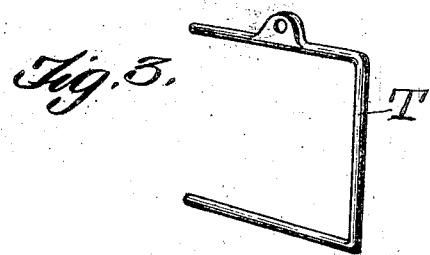

O. H. NELSON.
STORAGE BATTERY STAND AND MEANS FOR RAISING AND SUPPORTING PLATES, &c.
APPLICATION FILED OCT. 16, 1908.
914,301.
Patented Mar. 2, 1909.
3 SHEETS—SHEET 3.
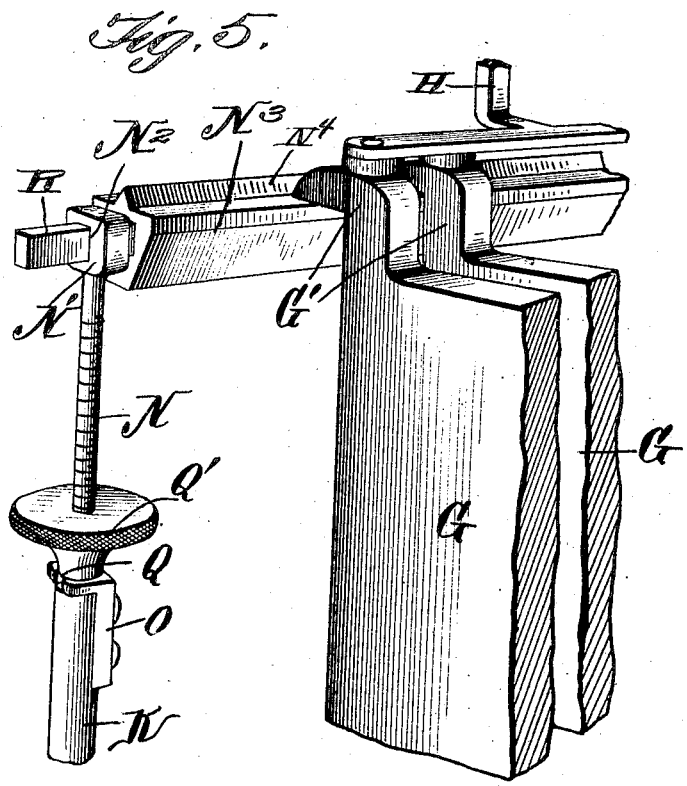
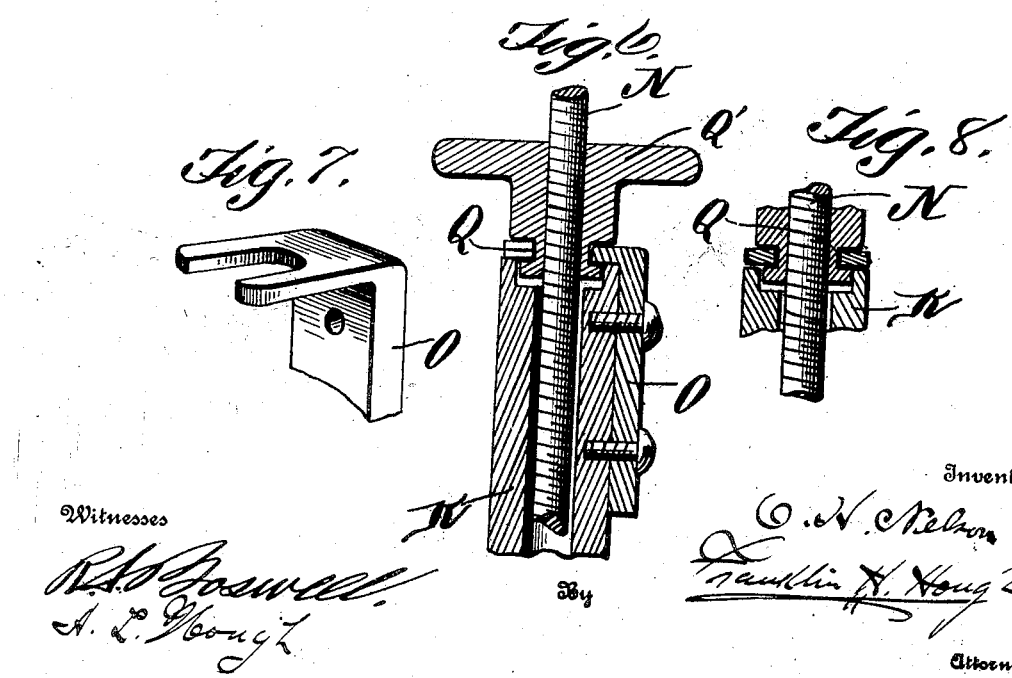

UNITED STATES PATENT OFFICE.

OTTO HENRY NELSON, OF HIGHLAND FALLS, NEW YORK, ASSIGNOR OF ONE-FOURTH TO ALEXANDER C. CORNELISON, OF HIGHLAND FALLS, NEW YORK.

STORAGE-BATTERY STAND AND MEANS FOR RAISING AND SUPPORTING PLATES, &c.

No. 914,301.

Specification of Letters Patent.  Patented March 2, 1909.

Application filed October 16, 1908.  Serial No. 458,047.

*To all whom it may concern:*

Be it known that I, OTTO HENRY NELSON, a citizen of the United States, residing at Highland Falls, in the county of Orange and State of New York, have invented certain new and useful Improvements in Storage-Battery Stands and Means for Raising and Supporting Plates, &c.; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in stands for storage batteries, and comprises apparatus for elevating and holding battery plates for convenience in cleaning cells.

At the present time, when it is desired to cleanse the sediment deposited in the bottoms of the cells of storage batteries, and which sediment or deposit causes short circuiting of the plates, it is necessary to disconnect the strips which connect alternate sets of plates, which latter are of a fragile nature, and remove the same from the liquid, and after being cleansed, replaced within the cleansed cell. This necessitates a considerable amount of time and trouble and the surfaces of the strips become oxidized, thus necessitating being scraped and again connected to each other. This procedure is necessarily slow and tiresome and to obviate these objections, it is our purpose to provide means whereby the entire series of plates without being disconnected, may be elevated and held in suspension while the cell is removed and cleansed, after which the plates may be lowered in the cells without injury to the plates.

The invention comprises various details of construction and combinations and arrangements of parts which will be hereinafter fully described and then specifically defined in the appended claims.

I illustrate my invention in the accompanying drawings, in which:—

Figure 1 is a side elevation showing cells of a battery, one of which shows the plates in readiness to be raised from the cell and the other showing the plates suspended and the cell lowered for convenience in cleansing. Fig. 2 is an end view of one of the cells of the battery resting upon the stand. Fig. 3 is an enlarged detail view of a clamping member for holding the strips intermediate the plates. Fig. 4 is an enlarged detail view of one of the strips which suspends the plates, and Figs. 5 and 6 are detail views of the plate hoisting screws. Fig. 7 is a detail perspective view of an angle plate in which an adjusting nut is swiveled, and Fig. 8 is a vertical sectional view showing the swivel connection between the nut and the plate.

Reference now being had to the details of the drawings by letter, A designates a stand having suitable transverse portions B spaced apart and provided with legs to the bottoms of which latter are fastened the insulators A'. Said stand has an open space intermediate said horizontally disposed portion B and through which the cell of the battery may be lowered. Suitable insulating knobs D are positioned upon the stand and upon which knobs cell supports E rest, and F—F designate cells which normally rest upon said supports.

G—G designate the plates of the batteries, each of which has at its upper marginal edge two outwardly projecting lugs or hooks G' which extend over opposite edges of the side walls of the cells and form means for supporting the plates so that their lower ends will be positioned at a slight distance above the bottom of the cell. To each lug G' is fastened a strip H, whereby the alternate plates are connected together by means of the clamps I.

Standards K are adapted to be supported upon the stand B and each of said standards has an elongated threaded opening for the reception of a hoisting screw N, the upper end of which has a head N' with a rectangular-outlined opening $N^2$ therein. Fixed to each standard is a bracket plate O, the upper end of which is angled and slotted, adapted to engage the annular groove Q in the hand wheel Q' forming a swivel connection between said wheel and bracket member. Said wheel has a central bore which is threaded to receive the threads of the screw N and is provided for the purpose of causing said screw to be raised and lowered as the hand wheel is turned. Strips R pass through the apertures $N^2$ in said screws and upon said strips are mounted the insulators $N^3$ which are adapted to bear against the under edges of the projecting lugs G' in the manner shown clearly in the drawings. Each of the insulators N³ is provided with a longitudinally pointed ridge N⁴ for the purpose of preventing any liquid accumulating upon the upper surface thereof which might have a tendency to short circuit the battery. A yoke T, a detail of which is shown in Fig. 3 of the drawings, is adapted to be applied to the series of plates in the manner illustrated in Fig. 1 of the drawings for the purpose of holding the separator sheets S, intermediate the plates, in place when the cell is removed for cleansing or other purposes. When it is desired to raise all of the plates of the battery, the standards and hoisting screws are placed in the positions shown in the drawings, with the insulators engaging the several projections G' of the plates and by turning the wheels Q', all of the plates in the cells may be raised slightly clear of the cell, thus allowing the liquid within the latter to be siphoned or otherwise removed and the cells lowered between the horizontal portion B of the stand, after the boards or plates E have been removed. When it is desired to replace the plates within the cells, the latter are raised about the plates, the boards E placed underneath the cell and the plates lowered so that the projections thereon will rest upon the upper edges of the cell.

From the foregoing, it will be noted that my invention contemplates broadly the idea of elevating and holding in suspension the plates of a battery and a supporting stand so arranged as to allow the cell to be lowered between the horizontal portions thereof and from around the plates, thus avoiding the necessity of disconnecting the several plates which is now the practice when the plates are removed separately from the cells for cleansing purposes.

What I claim to be new is:—

1. An apparatus for holding battery plates for convenience in cleaning the cells thereof, comprising a stand, a removable cell, plates normally in and sustained by the latter, a removable cell support upon the stand, and means for raising the plates slightly free from the cell to permit said support to be removed and the cell to be lowered between the side rails of the stand, allowing the cell to be freely removed from the stand, as set forth.

2. An apparatus for holding battery plates for convenience in cleaning the cells thereof, comprising a stand, a removable cell, plates normally in and sustained by the latter, a removable cell support upon the stand, means mounted upon the stand and adapted to raise slightly and hold said plates free from the cell to permit said support to be removed and the cell to be lowered between the side rails of the stand, allowing the cell to be freely removed from the stand, as set forth.

3. An apparatus for holding battery plates for convenience in cleaning the cells thereof, comprising a stand, a removable cell, plates having lateral projections normally supported by the walls of the cell, a removable cell support upon the stand, and means engaging said projections and adapted to raise slightly and hold the plates free from the cell to permit said support to be removed and the cell to be lowered between the side rails of the stand, allowing the cell to be freely removed from the stand, as set forth.

4. An apparatus for holding battery plates for convenience in cleaning the cells thereof, comprising a stand, a removable cell, plates having lateral projections normally supported by the walls of the cell, a removable cell support upon the stand, and means resting upon the stand and engaging the projecting portions of the plates and adapted to raise slightly the plates to permit said support to be removed and the cell to be lowered between the side rails of the stand, allowing the cell to be freely removed from the stand, as set forth.

5. An apparatus for holding battery plates for convenience in cleaning the cells thereof, comprising a stand, a removable cell, plates having lateral projections normally supported by the walls of the cell, a hollow insulator engaging said projections, a bar passing through the insulator, means engaging said bar for raising the same slightly to cause the plates to be separated slightly from the cell to permit said support to be removed and the cell to be lowered between the side rails of the stand and from which it may be freely removed laterally, as set forth.

6. An apparatus for holding battery plates for convenience in cleaning the cells thereof, comprising a stand, a removable cell, plates having lateral projections normally supported by the walls of the cell, a hollow insulator engaging said projections and having a longitudinal rib rising from the upper edge thereof, a bar passing through said insulator, and means for supporting the bar and causing the same to be raised slightly to free the plates from the cell and permit said support to be removed and the cell to be lowered between the side rails of the stand, thus allowing the cell to be freely removed laterally from the stand, as set forth.

7. An apparatus for holding battery plates for convenience in cleaning the cells thereof, comprising a stand, a removable cell, plates having lateral projections normally supported by the walls of the cell, a hollow insulator engaging said projections and having a longitudinal rib rising from the upper edge thereof, a bar passing through said insulator, a screw having a hollow head through which said bar passes and affording means for raising the bar and plates to permit said support to be removed and the cell to be lowered between the side rails of the stand, thus allowing for the free removal of the cell laterally from the stand, as set forth.

8. An apparatus for holding battery plates for convenience in cleaning cells, comprising a stand, insulated knobs upon the latter, a support upon said knobs and upon which a cell normally rests, hoisting screws supported upon the stand, bars engaging apertures in said screws, insulators on said bars adapted to engage projecting portions of the plates as the screws are rotated to raise the plates and hold the same independent of the cells, thus permitting said supports to be removed and the cell to be lowered between the side rails of the stand, thus allowing the cell to be freely removed laterally from the stand, as set forth.

9. An apparatus for holding battery plates for convenience in cleaning cells, comprising a stand, insulated knobs upon the latter, a support upon said knobs and upon which a cell normally rests, standards having openings therein, a screw mounted in each of said openings, bars engaging apertures in said screws, insulators upon said bars designed to be positioned underneath projections of said plates, and means for turning the screws whereby the plates may be raised slightly and held in suspension independent of the cells to permit said supports to be removed from the stand and cell to be lowered between the side rails thereof, as set forth.

10. An apparatus for holding battery plates for convenience in cleaning cells comprising a stand, insulator knobs upon the latter, a support upon said knobs and upon which the cell normally rests, hollow standards supported upon the stand, a screw mounted in each of said standards, bars passing through apertures in said screws, insulators upon said bars and adapted to be positioned underneath projections of said plates, a hand wheel mounted upon each of the screws and having threaded connection therewith, and bracket members fixed to each of the standards and having swivel connection with one of said wheels, thus affording means whereby the plates may be raised slightly to permit said support to be removed and the cell to be lowered between the side rails of the stand, as set forth.

11. An apparatus for holding battery plates for convenience in cleaning cells, comprising a stand, insulated knobs upon the latter, a support supported upon said knobs and upon which a cell normally rests, hoisting screws supported upon said stand, and strips engaging apertures in said screws, insulators on said strips and adapted to engage projecting portions of the plates as the screws are rotated to raise the plates and hold the same independent of the cells, as set forth.

12. An apparatus for holding battery plates for convenience in cleaning cells, comprising a stand, insulated knobs upon the latter, a board supported upon said knobs and upon which a battery is normally supported, standards having openings therein, a screw mounted in each of said openings, a strip engaging apertures in said screws, insulators upon said strip and designed to be positioned underneath projections of the plates, and means for turning said screws whereby the plates may be raised and held in suspension independent of the cells, as set forth.

13. An apparatus for holding battery plates for convenience in cleaning cells, comprising a stand, insulated knobs upon the latter, a support upon said knobs and upon which the cell normally rests, hollow standards supported by the stand, a screw mounted in each of said standards provided with an opening therein, a strip passing through the openings in said screws, insulators upon said strips and designed to be positioned underneath projections of the plates, a hand wheel mounted upon each of said screws and having threaded connection therewith, and bracket members fixed one to each of said standards and having swivel connection with one of said wheels as set forth.

In testimony whereof I hereunto affix my signature in the presence of two witnesses.

OTTO HENRY NELSON.

Witnesses:
 EDMUND J. STEERE,
 WILLIAM B. ANDREWS.